United States Patent
Sako et al.

(10) Patent No.: US 9,425,730 B2
(45) Date of Patent: Aug. 23, 2016

(54) APPARATUS FOR ESTIMATING QUANTITY OF STATE RELATING TO MOTOR, AND ELECTRIC TOOL

(75) Inventors: Masahiko Sako, Anjo (JP); Hirokatsu Yamamoto, Anjo (JP); Takaaki Osada, Anjo (JP)

(73) Assignee: MAKITA CORPORATION, Anjo-Shi (JP)

( * ) Notice: Subject to any disclaimer, the term of this patent is extended or adjusted under 35 U.S.C. 154(b) by 331 days.

(21) Appl. No.: 13/980,941

(22) PCT Filed: Jan. 19, 2012

(86) PCT No.: PCT/JP2012/051088
§ 371 (c)(1),
(2), (4) Date: Jul. 22, 2013

(87) PCT Pub. No.: WO2012/108246
PCT Pub. Date: Aug. 16, 2012

(65) Prior Publication Data
US 2013/0300333 A1    Nov. 14, 2013

(30) Foreign Application Priority Data

Feb. 10, 2011    (JP) ................. 2011-027787

(51) Int. Cl.
*H02K 17/32* (2006.01)
*G05B 9/02* (2006.01)
(Continued)

(52) U.S. Cl.
CPC ............... *H02P 31/00* (2013.01); *B25F 5/00* (2013.01); *G05B 17/02* (2013.01); *H02P 6/06* (2013.01);
(Continued)

(58) Field of Classification Search
USPC ................................. 318/434, 563
See application file for complete search history.

(56) References Cited

U.S. PATENT DOCUMENTS

| | | | | |
|---|---|---|---|---|
| 4,392,100 A | * | 7/1983 | Stanton | H02P 23/0027 318/803 |
| 4,468,597 A | * | 8/1984 | Baumard | H02P 7/29 318/455 |

(Continued)

FOREIGN PATENT DOCUMENTS

| | | |
|---|---|---|
| DE | 196 30 986 A1 | 2/1997 |
| DE | 10 2009 001331 A1 | 9/2010 |

(Continued)

OTHER PUBLICATIONS

International Preliminary Report on Patentability issued in International Patent Application No. PCT/JP2012/051088 dated Aug. 13, 2013.

(Continued)

*Primary Examiner* — Bentsu Ro
*Assistant Examiner* — Devon Joseph
(74) *Attorney, Agent, or Firm* — Oliff PLC

(57) ABSTRACT

The present application discloses an apparatus including: a motor model that reflects a characteristic of a motor and includes at least inputs pertaining to a first quantity of state and a second quantity of state and an output pertaining to a third quantity of state; a comparator that calculates a difference between the third quantity of state in an actual motor and the third quantity of state output from the motor model; and an amplifier that amplifies an output of the comparator at a predetermined gain. The first quantity of state in the actual motor is input into the motor model as the first quantity of state, and an output of the amplifier is input into the motor model as the second quantity of state. The apparatus then uses the output of the amplifier as an estimated value of the second quantity of state in the actual motor.

23 Claims, 8 Drawing Sheets

(51) Int. Cl.
    *H02P 31/00*     (2006.01)
    *B25F 5/00*     (2006.01)
    *H02P 7/29*     (2016.01)
    *H02P 6/06*     (2006.01)
    *H02P 7/295*     (2016.01)
    *H02P 23/12*     (2006.01)
    *G05B 17/02*     (2006.01)
    *H02P 23/14*     (2006.01)

(52) U.S. Cl.
    CPC . *H02P 6/34* (2016.02); *H02P 7/29* (2013.01); *H02P 7/295* (2013.01); *H02P 23/12* (2013.01); *H02P 23/14* (2013.01)

(56) References Cited

U.S. PATENT DOCUMENTS

| | | | |
|---|---|---|---|
| 4,503,370 A | 3/1985 | Cuneo | |
| 4,764,760 A * | 8/1988 | Bedard | G01N 29/14 340/680 |
| 4,772,830 A * | 9/1988 | Kobari et al. | 318/563 |
| 4,792,737 A * | 12/1988 | Goff | G05B 13/04 318/560 |
| 5,341,264 A * | 8/1994 | Hashimoto | 360/132 |
| 5,525,877 A * | 6/1996 | Umida | H02P 23/0045 318/432 |
| 5,602,347 A * | 2/1997 | Matsubara | G05B 19/4065 700/175 |
| 5,872,439 A | 2/1999 | Nomura | |
| 6,014,598 A * | 1/2000 | Duyar | G01R 31/343 701/31.9 |
| 6,304,052 B1 * | 10/2001 | O'Meara | H02P 6/085 318/700 |
| 6,411,052 B1 * | 6/2002 | Mir | H02P 6/10 318/434 |
| 6,515,447 B2 * | 2/2003 | Horng et al. | 318/807 |
| 6,662,075 B2 * | 12/2003 | Kalker | H02H 7/0851 700/213 |
| 6,766,683 B2 * | 7/2004 | Kalker | H02H 7/0851 700/213 |
| 7,668,690 B2 * | 2/2010 | Schneider | G01P 3/44 318/470 |
| 2005/0168862 A1 * | 8/2005 | Jeong | G11B 5/5534 360/75 |
| 2005/0174124 A1 * | 8/2005 | Huang | B23K 26/04 324/520 |
| 2005/0218859 A1 * | 10/2005 | Kuwano | H02P 8/14 318/685 |
| 2006/0125440 A1 * | 6/2006 | Gordon et al. | 318/723 |
| 2006/0160511 A1 * | 7/2006 | Trichy | G06F 13/4072 455/255 |
| 2006/0209480 A1 * | 9/2006 | Fritsch et al. | 361/79 |
| 2007/0267990 A1 * | 11/2007 | Abolhassani | H02P 6/142 318/432 |
| 2008/0247735 A1 * | 10/2008 | Kazanzides et al. | 388/815 |
| 2008/0298784 A1 * | 12/2008 | Kastner | G01P 3/44 388/811 |
| 2009/0224707 A1 * | 9/2009 | Williams | B62D 5/0481 318/400.02 |
| 2009/0302798 A1 * | 12/2009 | Wei | H02P 7/295 318/689 |
| 2010/0182715 A1 * | 7/2010 | Harmer | G11B 21/22 360/75 |
| 2012/0059642 A1 | 3/2012 | Vollmer et al. | |

FOREIGN PATENT DOCUMENTS

| | | |
|---|---|---|
| EP | 0 246 326 A1 | 11/1987 |
| JP | H01-227679 A | 9/1989 |
| JP | A-2001-69786 | 3/2001 |
| JP | A-2002-58295 | 2/2002 |
| JP | A-2004-40850 | 2/2004 |
| JP | A-2010-51162 | 3/2010 |
| JP | A-2010-246260 | 10/2010 |

OTHER PUBLICATIONS

Jun. 30, 2015 Office Action issued in Japanese Patent Application No. 2012-556815.
International Search Report issued in International Patent Application No. PCT/JP2012/051088 date Apr. 24, 2012.
Mar. 10, 2016 Search Report issued in European Patent Application No. 12745210.0.

\* cited by examiner

… (1) …

APPARATUS FOR ESTIMATING QUANTITY OF STATE RELATING TO MOTOR, AND ELECTRIC TOOL

TECHNICAL FIELD

The technique disclosed in the present application relates to an apparatus for estimating a quantity of state relating to a motor, and an electric tool.

BACKGROUND ART

U.S. Pat. No. 4,503,370 discloses a technique for estimating a torque acting on a motor on the basis of a current flowing through the motor.

SUMMARY OF INVENTION

When a motor is driven steadily at a fixed rotation speed, a torque acting on the motor can be calculated easily from a current flowing through the motor. However, when the motor exhibits unsteady behavior during starting of the motor and in cases where rapidly varying torque acts on the motor or the like, for example, it is difficult to estimate the torque acting on the motor precisely. The torque can be detected with a high degree of precision by providing a torque sensor, but in this case, increases in cost and apparatus size occur. The torque sensor may also be problematic in terms of durability. Hence, there is need for a technique with which a quantity of state relating to a motor, such as the torque acting on the motor, can be estimated with a high degree of precision on the basis of another quantity of state.

The present application provides a technique with which a quantity of state relating to a motor can be estimated with a high degree of precision on the basis of another quantity of state.

The present application discloses an apparatus for estimating a quantity of state relating to a motor. The apparatus includes: a motor model that reflects a characteristic of a motor and includes at least inputs pertaining to a first quantity of state and a second quantity of state relating to the motor and an output pertaining to a third quantity of state relating to the motor; a comparator that calculates a difference between the third quantity of state in an actual motor and the third quantity of state output from the motor model; and an amplifier that amplifies an output of the comparator at a predetermined gain. In this apparatus, the first quantity of state in the actual motor is input into the motor model as the first quantity of state, and an output of the amplifier is input into the motor model as the second quantity of state. The apparatus uses the output of the amplifier as an estimated value of the second quantity of state in the actual motor.

Note that here, a "quantity of state relating to a motor" is a quantity of state relating to behavior of the motor, including, for example, a voltage applied to the motor, a current flowing through the motor, a torque acting on the motor, a rotation speed of the motor, and so on.

With the apparatus described above, a feedback loop including the motor model is constructed, and the behavior of the actual motor can be simulated using the motor model. The second quantity of state input into the motor model is adjusted on the basis of the first quantity of state and the third quantity of state in the actual motor such that the third quantity of state is realized under the first quantity of state. As a result, the second quantity of state input into the motor model, or in other words the output of the amplifier, can be used as the estimated value of the second quantity of state in the actual motor. According to the apparatus described above, the behavior of the actual motor can be simulated using the motor model even when the actual motor exhibits unsteady behavior, and therefore the second quantity of state of the motor can be estimated with a high degree of precision.

According to the technique disclosed in the present application, a quantity of state relating to a motor can be estimated with a high degree of precision on the basis of another quantity of state.

DESCRIPTION OF EMBODIMENTS

Figure 1:
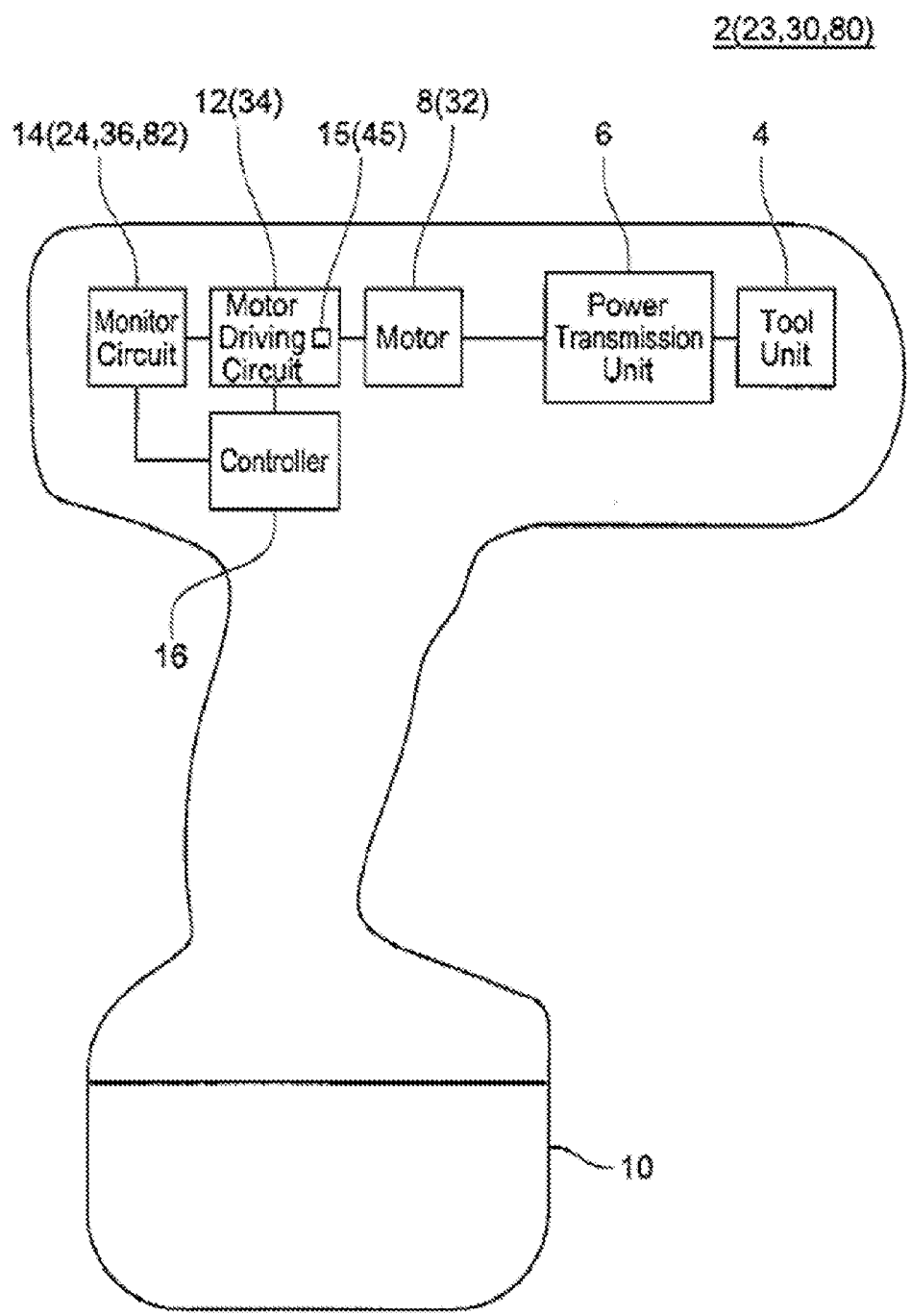
FIG. 1 is a pattern diagram showing a constitution of an electric tool 2.

In an apparatus according to an embodiment, a first quantity of state is a voltage applied to a motor, a second quantity of state is a torque acting on the motor, and a third quantity of state is a current flowing through the motor. With a constitution of this type, the torque acting on the motor can be estimated on the basis of the voltage applied to the motor and the current flowing through the motor. The torque acting on the motor can be estimated with a high degree of precision without using a specialized sensor to measure the torque.

In an apparatus according to another embodiment, the first quantity of state is the voltage applied to the motor, the second quantity of state is the torque acting on the motor, and the third quantity of state is a rotation speed of the motor. With a constitution of this type, the torque acting on the motor can be estimated on the basis of the voltage applied to the motor and the rotation speed of the motor. The torque acting on the motor can be estimated with a high degree of precision without using a specialized sensor to measure the torque.

In an apparatus according to another embodiment, a motor model further includes an output pertaining to a fourth quantity of state relating to the motor, and the fourth quantity of state output from the motor model is set as an estimated value of the fourth quantity of state in an actual motor. With a constitution of this type, both the second quantity of state and the fourth quantity of state can be estimated with a high degree of precision on the basis of the first quantity of state and the third quantity of state in the actual motor.

In the embodiment described above, the first quantity of state may be the voltage applied to the motor, the second quantity of state may be the torque acting on the motor, the third quantity of state may be the current flowing through the motor, and the fourth quantity of state may be the rotation speed of the motor. With a constitution of this type, the torque acting on the motor and the rotation speed of the motor can be estimated with a high degree of precision on the basis of the voltage applied to the motor and the current flowing through the motor.

Alternatively, in the embodiment described above, the first quantity of state may be the voltage applied to the motor, the second quantity of state may be the torque acting on the motor, the third quantity of state may be the rotation speed of the motor, and the fourth quantity of state may be the current flowing through the motor. With a constitution of this type, the torque acting on the motor and the current flowing through the motor can be estimated with a high degree of precision on the basis of the voltage applied to the motor and the rotation speed of the motor.

The embodiment described above may be constituted such that the motor is controlled by causing a current to flow thereto intermittently, the motor model further includes an output pertaining to a voltage applied to the motor, the apparatus further includes a second comparator that calculates a difference between the voltage applied to the motor in the actual motor and the voltage applied to the motor output from the motor model and a second amplifier that amplifies an output of the second comparator at a predetermined gain, the output of the amplifier is added to an output of the second amplifier and then input into the motor model as the torque acting on the motor, and a value obtained by adding the output of the second amplifier to the output of the amplifier is set as an estimated value of a torque acting on the actual motor. With a constitution of this type, even when a motor that is subjected to PWM control, phase control, or the like is used, the torque acting on the motor can be estimated with a high degree of precision.

The embodiment described above may be constituted such that the apparatus further comprises a first filter that removes at least high frequency components and a second filter having identical characteristics as the first filter, wherein the motor is controlled by flowing a current intermittently, the current flowing through the motor in the actual motor is input to the comparator via the first filter, and a voltage applied to the motor in the actual motor is input to the motor model via the second filter. With a constitution of this type, even when a motor that is subjected to PWM control, phase control, or the like is used, the torque acting on the motor can be estimated with a high degree of precision.

The embodiment described above may be constituted such that the motor is installed in an electric tool having a tool unit and a power transmission unit for transmitting a rotation of the motor to the tool unit, the apparatus further includes a power transmission unit model that reflects a characteristic of the power transmission unit and has a torque acting on the power transmission unit from the tool unit as an input and a torque acting on the motor from the power transmission unit as an output, the output of the amplifier is input into the motor model via the power transmission unit model as the torque acting on the motor, and the output of the amplifier is set as an estimated value of a torque acting on an actual tool unit rather than the estimated value of the torque acting on the actual motor. With a constitution of this type, the torque acting on the tool unit can be estimated with a high degree of precision on the basis of the voltage applied to the motor and the current flowing through the motor or on the basis of the voltage applied to the motor and the rotation speed of the motor.

An electric tool including the apparatus described above also possesses novelty and utility. When an electric tool is used for work, a motor thereof often exhibits unsteady behavior at the start and end of the work and so on. When the apparatus described above is used, a quantity of state relating to the motor can be estimated with a high degree of precision. Here, the electric tool may be an electric tool for metalwork, an electric tool for woodwork, an electric tool for masonry, or an electric tool for gardening. More specifically, examples of the electric tool include an electric drill, an electric screwdriver, an electric wrench, an electric grinder, an electric circular saw, an electric reciprocating saw, an electric jigsaw, an electric hammer, an electric cutter, an electric chainsaw, an electric planer, an electric nailing machine (including a riveting machine) an electric hedge trimmer, an electric lawn trimmer, an electric lawnmower, an electric bush cutter, an electric blower, an electric cleaner, and so on.

First Embodiment

As shown in FIG. 1, an electric tool 2 according to this embodiment includes a tool unit 4, a power transmission unit 6, a motor 8, a battery 10, a motor driving circuit 12, a monitor circuit 14, and a controller 16. The electric tool 2 may be an impact wrench, an impact hammer, a screwdriver, or the like, for example.

In the electric tool 2, the motor 8 is driven to rotate by the motor driving circuit 12, and the power transmission unit 6 transmits a rotation of the motor 8 to the tool unit 4. The motor driving circuit 12 includes a current detection unit 15 that detects a current flowing through the motor 8. The monitor circuit 14 estimates a torque $\tau$ acting on the motor 8 and a rotation speed $\omega$ of the motor 8 on the basis of a voltage V applied to the motor 8 and a current i flowing through the motor 8. The voltage V applied to the motor 8, the current i flowing through the motor 8, the torque $\tau$ acting on the motor 8, and the rotation speed $\omega$ of the motor 8 may be said to be quantities of state relating to the motor 8.

Figure 2:
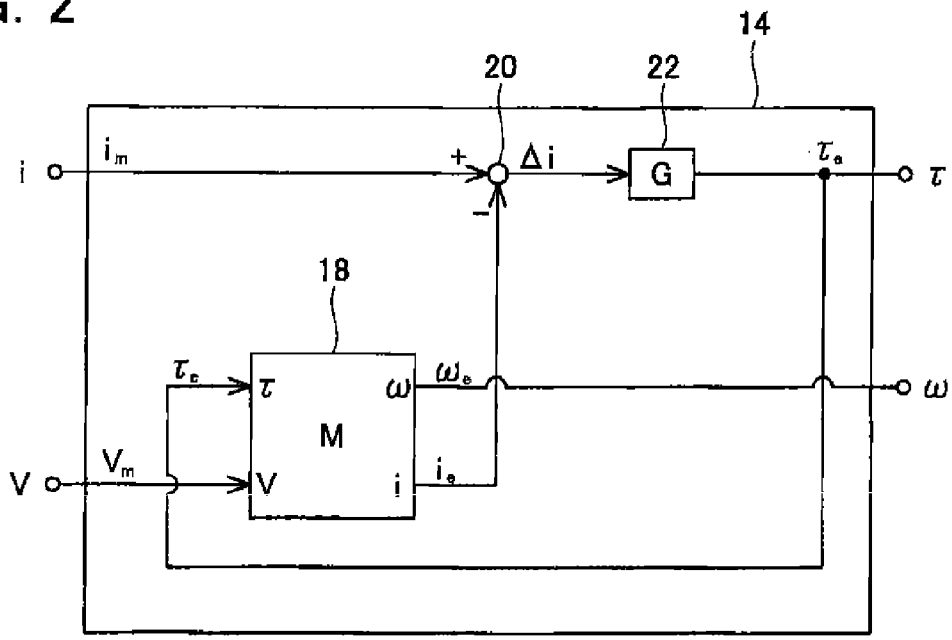
FIG. 2 is a block diagram showing a constitution of a monitor circuit 14.

As shown in FIG. 2, an actually measured value $V_m$ of the voltage applied to the motor 8 and an actually measured value $i_m$ of the current flowing through the motor 8 are input into the monitor circuit 14. The monitor circuit 14 outputs an estimated value $\tau_e$ of the torque acting on the motor 8 and an estimated value $\omega_e$ of the rotation speed of the motor 8. The monitor circuit 14 includes a motor model 18, a comparator 20, and an amplifier 22.

The motor model 18 models characteristics of the motor 8 as a two-input, two-output transfer system. In the motor model 18, the voltage V applied to the motor 8 and the torque $\tau$ acting on the motor 8 are set as inputs, while the current i flowing through the motor 8 and the rotation speed $\omega$ of the motor 8 are set as outputs.

Characteristics of the motor model 18 can be specified on the basis of an input-output characteristic of the actual motor 8. For example, when the motor 8 is a DC motor, the characteristics of the motor model 18 can be determined as follows.

When L is set as an inductance, i is set as the current, V is set as the applied voltage, R is set as a resistance value, KB is set as a power generation constant, and ω is set as the rotation speed with respect to an electrical system of the motor 8, a following relational expression is established.

$$L\frac{di}{dt} = V - Ri - KB\omega \qquad \text{(Equation 1)}$$

Meanwhile, when J is set as a moment of inertia of a rotor, KT is set as a torque constant, B is set as a friction constant, and τ is set as the torque with respect to a mechanical system of the motor 8, a following relational expression is established.

$$J\frac{d\omega}{dt} = KTi - B\omega - \tau \qquad \text{(Equation 2)}$$

When both sides of Equation 1 and Equation 2 are integrated relative to time, two following relational expressions are obtained.

$$i = \int\left(\frac{1}{L}V - \frac{R}{L}i - \frac{KB}{L}\omega\right)dt \qquad \text{(Equation 3)}$$

$$\omega = \int\left(\frac{KT}{J}i - \frac{B}{J}\omega - \frac{1}{J}\tau\right)dt \qquad \text{(Equation 4)}$$

The two outputs i, ω can be calculated relative to the two inputs V, τ by performing a numerical calculation on the basis of Equation 3 and Equation 4. As is evident from the above, when the motor model 18 is constructed with the voltage V applied to the motor 8 and the torque τ acting on the motor 8 as inputs and the current i flowing through the motor 8 and the rotation speed ω of the motor 8 as outputs, the respective outputs can be obtained by performing an integration operation with respect to the quantities of state of the motor 8 rather than a differentiation operation. It is typically difficult to perform a differentiation operation with a high degree of precision when the quantities of state of the motor 8 vary rapidly in a case where the monitor circuit 14 is constituted by a single chip microcomputer or the like. However, by constructing the motor model 18 such that the outputs are obtained through an integration operation, as described above, a behavior of the motor 8 can be simulated with a high degree of precision even when the quantities of state of the motor 8 vary rapidly.

As shown in FIG. 2, a current output of the motor model 18, or in other words the estimated value $i_e$ of the current flowing through the motor 8, is provided to the comparator 20. In the comparator 20, a difference Δi between the actually measured value $i_m$ of the current flowing through the motor 8 and the current output $i_e$ of the motor model 18 is calculated. The calculated difference Δi is amplified at a predetermined gain G in the amplifier 22, and then input into a torque input of the motor model 18 as an estimated torque $\tau_e$ of the motor 8. Thus, a feedback loop is constructed in the monitor circuit 14. Note that the actually measured value $V_m$ of the voltage applied to the motor 8 is input into a voltage input of the motor model 18.

On the feedback loop described above, a magnitude of the input torque of the motor model 18, or in other words a magnitude of the estimated value $\tau_e$ of the torque acting on the motor 8, is adjusted by setting the gain G used in the amplifier 22 to be sufficiently large so that the current output of the motor model 18, or in other words the estimated value $i_e$ of the current flowing through the motor 8, converges with the actually measured value $i_m$ of the current flowing through the motor 8. With this constitution, the torque $\tau_e$ acting on the motor 8 at which the current $i_m$ flowing through the motor 8 is realized when the voltage $V_m$ is applied to the motor 8, and the rotation speed $\omega_i$ of the motor 8 at this time, can be calculated using the motor model 18.

The monitor circuit 14 outputs the torque estimated value $\tau_e$ as described above, and outputs a rotation speed output of the motor model 18 as the estimated value $\omega_e$ of the rotation speed of the motor 8.

Figure 3:
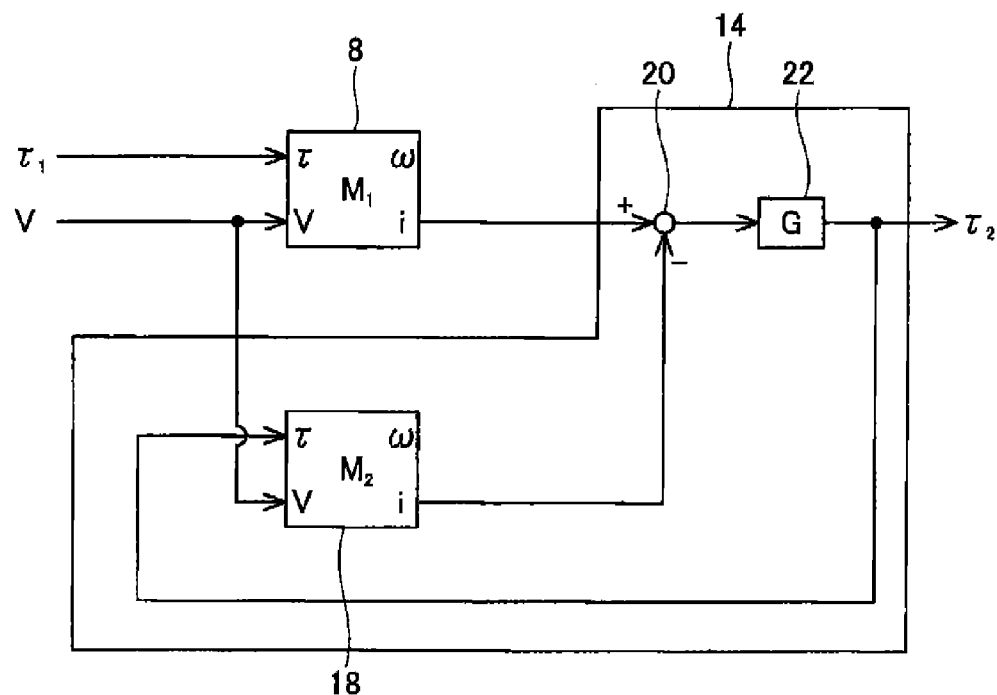
FIG. 3 is a block diagram showing a constitution obtained by combining the monitor circuit 14 with a motor 8.

A principle employed to estimate the torque τ and the rotation speed ω of the motor 8 using the monitor circuit 14 will now be described with reference to FIG. 3. In FIG. 3, the actual motor 8 is expressed by a transfer function $M_1$, and the motor model 18 artificially modeling the motor 8 in the monitor circuit 14 is expressed by a transfer function $M_2$. A relationship between an input $\tau_1$ (a torque value acting on the actual motor 8) and an output $\tau_2$ (the torque estimated value output from the monitor circuit 14) of a control system shown in FIG. 3 is as follows.

$$\tau_2 = \frac{GM_1}{1 + GM_2}\tau_1 \qquad \text{(Equation 5)}$$

Hence, by setting the motor model 18 in the monitor circuit 14 to have equal characteristics to the actual motor 8, $M_1 = M_2 = M$ can be inserted into the above equation, whereby a following relational expression is obtained.

$$\tau_2 = \frac{GM}{1 + GM}\tau_1 \qquad \text{(Equation 6)}$$

Figure 4:
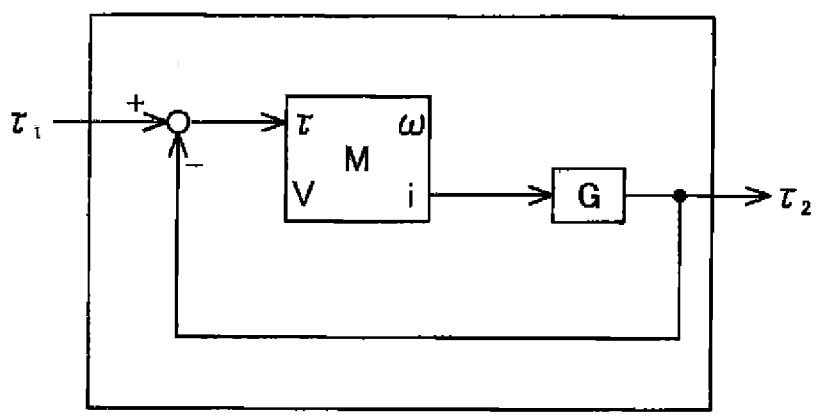
FIG. 4 is a block diagram showing an equivalent control system to a control system shown in FIG. 3.

As is evident from Equation 6, a transfer function from the input $\tau_1$ to the output $\tau_2$ of the control system shown in FIG. 3 is equivalent to that of a feedback control system such as that shown in FIG. 4, in which a forward transfer function is GM and a backward transfer function is 1. Accordingly, the output $\tau_2$ varies in conjunction with the input $\tau_1$. By setting the gain G of the amplifier 22 to be sufficiently large, the output $\tau_2$ converges with the input $\tau_1$. Therefor; the torque $\tau_1$ acting on the motor 8 can be learned from the torque estimated value $\tau_2$ output from the monitor circuit 14.

Using the monitor circuit 14 according to this embodiment, the torque τ acting on the motor 8 can be estimated with a high degree of precision on the basis of the voltage V applied to the motor 8 and the current i flowing through the motor 8 without providing a specialized sensor to detect the torque.

Using the monitor circuit 14 according to this embodiment, the rotation speed ω of the motor 8 can be estimated with a high degree of precision on the basis of the voltage V applied to the motor 8 and the current i flowing through the motor 8 without providing a specialized sensor to detect the rotation speed.

In the monitor circuit 14 according to this embodiment, the current output $i_e$ of the motor model 18 is caused to converge with the current $i_m$ flowing through the actual motor 8 using the feedback loop that includes the motor model 18 having the voltage V applied to the motor 8 and the torque τ acting on the motor 8 as inputs and the current i flowing through the motor 8 and the rotation speed ω of the motor 8 as outputs. With this constitution, the torque τ acting on the motor 8 and the rotation speed ω of the motor 8 can be estimated precisely without performing a differentiation operation.

Second Embodiment

Figure 5:
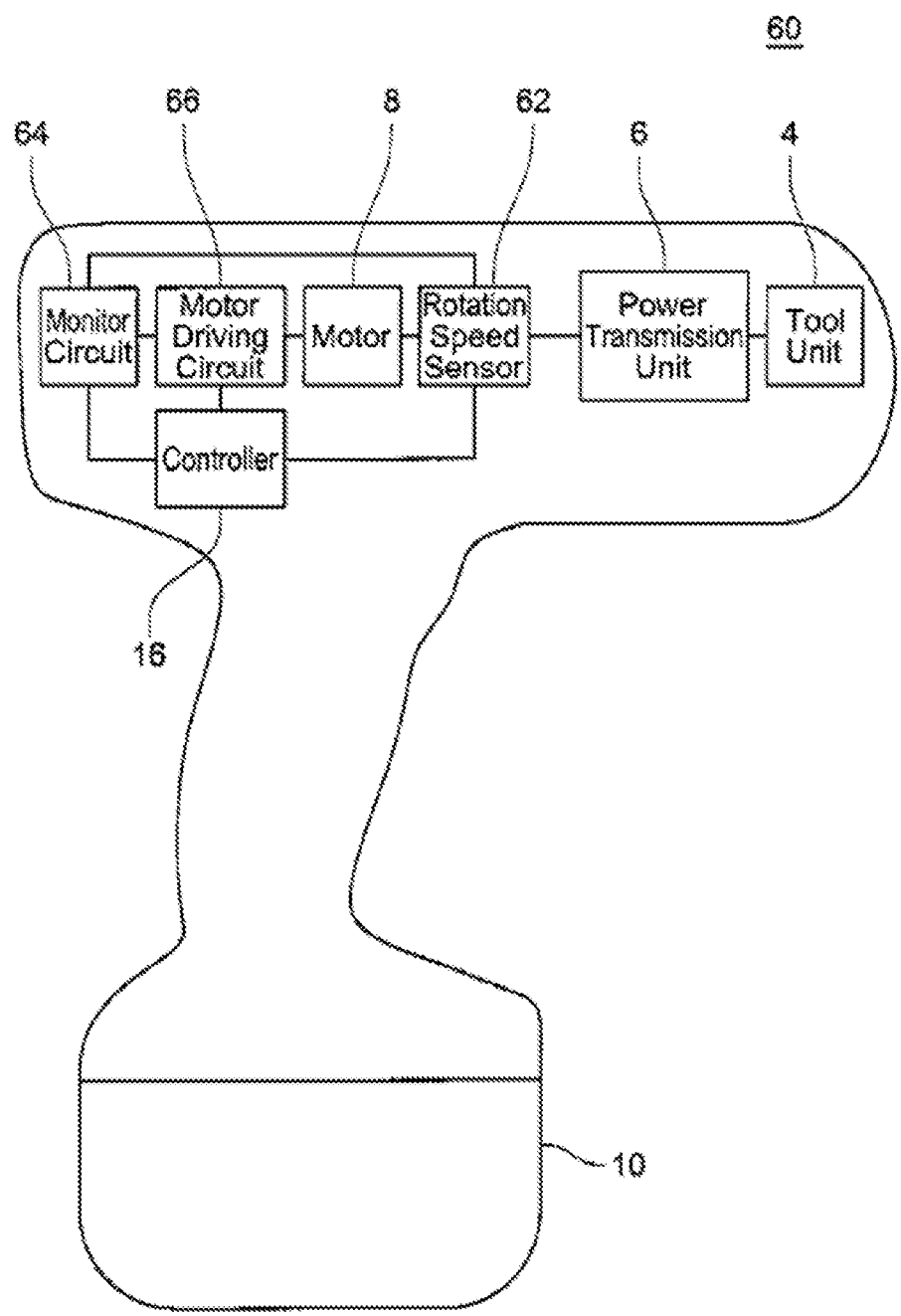
FIG. 5 is a pattern diagram showing a constitution of an electric tool 60.

As shown in FIG. 5, an electric tool 60 according to this embodiment includes the tool unit 4, the power transmission unit 6, a rotation speed sensor 62, the motor 8, the battery 10, a motor driving circuit 66, a monitor circuit 64, and the controller 16. The motor driving circuit 66 according to this embodiment does not include a current detection unit. The rotation speed sensor 62 detects the rotation speed ω of the motor 8 and outputs the detected rotation speed ω to the monitor circuit 64. When the motor 8 is a DC brushless motor, a rotation speed sensor provided as a part of a structure of the motor 8 may be used as the rotation speed sensor 62. The monitor circuit 64 estimates the torque τ acting on the motor 8 and the current i flowing through the motor 8 on the basis of the voltage V applied to the motor 8 and the rotation speed ω of the motor 8, which is input from the rotation speed sensor 62.

Figure 6:
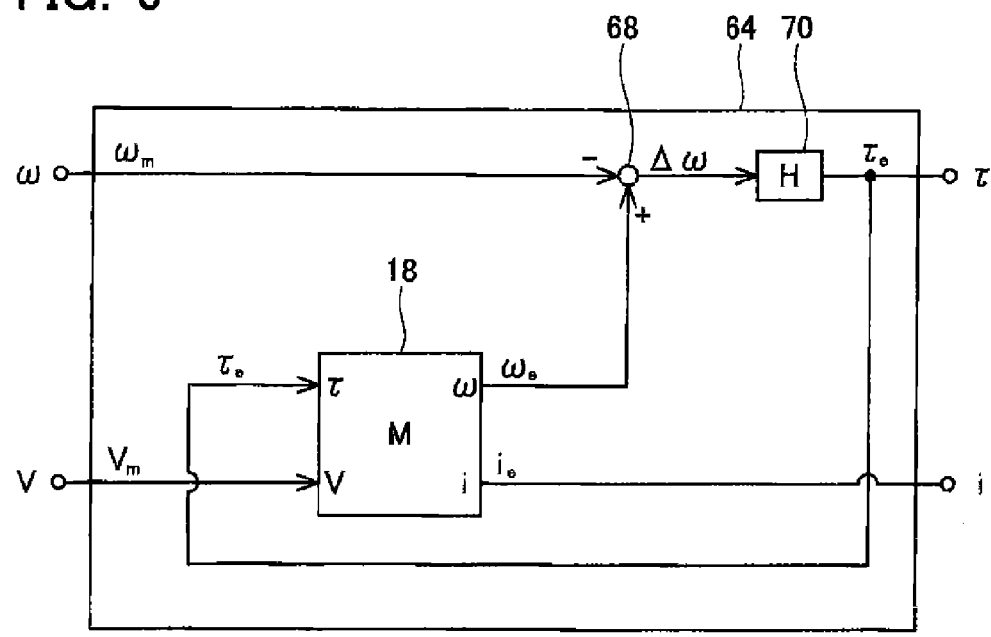
FIG. 6 is a block diagram showing a constitution of a monitor circuit 64.

As shown in FIG. 6, the actually measured value $V_m$ of the voltage applied to the motor 8 and the actually measured value $\omega_m$ of the rotation speed of the motor 8 are input into the monitor circuit 64. The monitor circuit 64 outputs the estimated value $\tau_e$ of the torque acting on the motor 8 and the estimated value $i_e$ of the current flowing through the motor 8. The monitor circuit 64 includes the motor model 18, a comparator 68, and an amplifier 70.

The motor model 18 models characteristics of the motor 8 as a two-input, two-output transfer system. In the motor model 18, the voltage V applied to the motor 8 and the torque τ acting on the motor 8 are set as inputs, while the current i flowing through the motor 8 and the rotation speed ω of the motor 8 are set as outputs.

As shown in FIG. 6, the rotation speed output of the motor model 18, or in other words the estimated value $\omega_e$ of the rotation speed of the motor 8, is provided to the comparator 68. In the comparator 68, a difference Δω between an actually measured value $\omega_m$ of the rotation speed of the motor 8 and the rotation speed output $\omega_e$ of the motor model 18 is calculated. The calculated difference Δω is amplified at a predetermined gain H in the amplifier 70, and then input into the torque input of the motor model 18 as the estimated torque $\tau_e$ of the motor 8. Thus, a feedback loop is constructed in the monitor circuit 64. Note that the actually measured value $V_m$ of the voltage applied to the motor 8 is input into the voltage input of the motor model 18.

On the feedback loop described above, the magnitude of the input torque of the motor model 18, or in other words the magnitude of the estimated value $\tau_e$ of the torque acting on the motor 8, is adjusted by setting the gain H used in the amplifier 70 to be sufficiently large so that the rotation speed output of the motor model 18, or in other words the estimated value $\omega_e$ of the rotation speed of the motor 8, converges with the actually measured value $\omega_m$ of the rotation speed of the motor 8. With this constitution, the torque $\tau_e$ acting on the motor 8 at which the rotation speed $\omega_m$ of the motor 8 is realized when the voltage $V_m$ is applied to the motor 8, and the current $i_e$ flowing through the motor 8 at this time, can be estimated using the motor model 18.

The monitor circuit 64 outputs the torque estimated value $\tau_e$ as described above, and outputs the current output of the motor model 18 as the estimated value $i_e$ of the current flowing through the motor 8.

Using the monitor circuit 64 according to this embodiment, the torque τ acting on the motor 8 can be estimated with a high degree of precision on the basis of the voltage V applied to the motor 8 and the rotation speed ω of the motor 8 without providing a specialized sensor to detect the torque.

Using the monitor circuit 64 according to this embodiment, the current i flowing through the motor 8 can be estimated with a high degree of precision on the basis of the voltage V applied to the motor 8 and the rotation speed ω of the motor 8 without providing a specialized sensor to detect the current. Resistance loss occurring when a circuit for detecting the current is provided can be avoided, enabling an improvement in energy efficiency.

Third Embodiment

An electric tool 30 according to this embodiment is constituted substantially identically to the electric tool 2 according to the first embodiment, shown in FIG. 1. In the electric tool 30 according to this embodiment, a motor 32 is constituted by a DC motor, and a motor driving circuit 34 subjects the motor 32 to PWM control. A monitor circuit 36 outputs a torque and a rotation speed of the motor 32.

Figure 7:
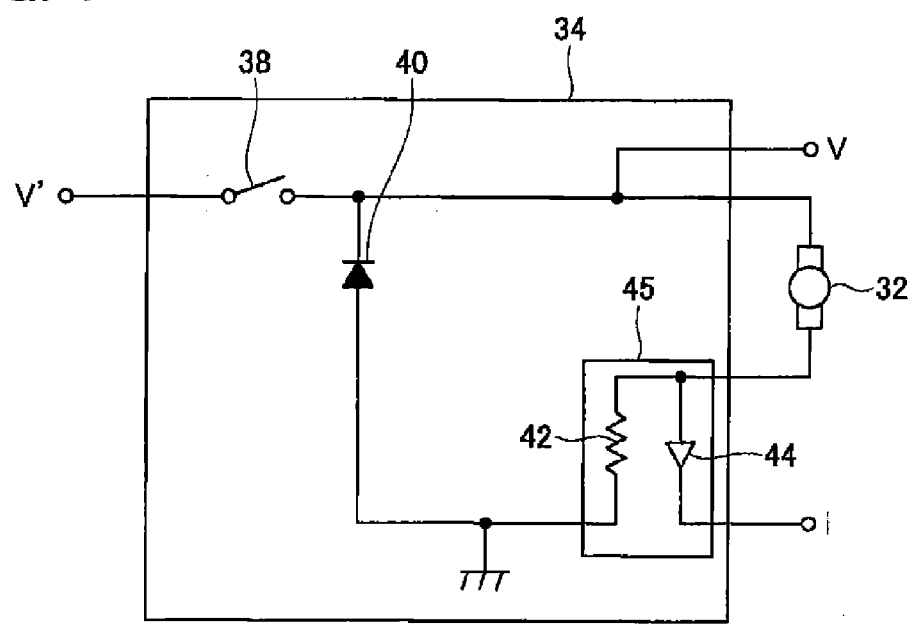
FIG. 7 is a circuit diagram showing a constitution of a motor driving circuit 34.

As shown in FIG. 7, the motor driving circuit 34 includes a semiconductor switch 38, a flyback diode 40, a current detecting resistor 42, and an amplifier 44. The current detecting resistor 42 and the amplifier 44 together constitute a current detection unit 45. Note that in this embodiment, a voltage applied to the motor driving circuit 34 is expressed by V', while a voltage applied to the motor 32 (i.e. a terminal voltage of the motor 32) is expressed by V.

The semiconductor switch 38 is switched between conduction and non-conduction by the controller 16. An operation of the motor 32 is controlled by adjusting respective widths of an conduction period and a non-conduction period of the semiconductor switch 38.

The flyback diode 40 is provided with a surge current generated by the motor 32 to flow during the non-conduction period of the semiconductor switch 38.

The current detecting resistor 42 is a resistor having a resistance that is too low to affect the operation of the motor 32. A current i flowing through the motor 32 can be detected by dividing a voltage drop in the current detecting resistor 42 by a resistance value of the current detecting resistor 42. In this embodiment, a voltage of one end of the current detecting resistor 42, another end of which is grounded, is amplified by the amplifier 44 and output as an actually measured value of the current flowing through the motor 32. The amplifier 44 has a gain that corresponds to an inverse of the resistance value of the current detecting resistor 42.

Figure 8:
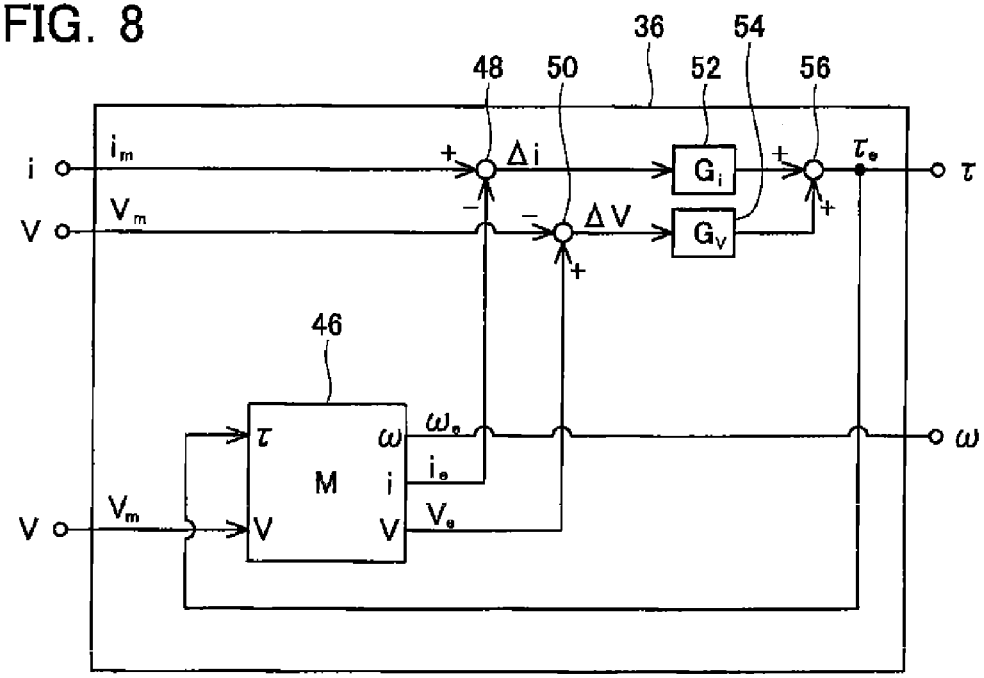
FIG. 8 is a block diagram showing a constitution of a monitor circuit 36.

As shown in FIG. 8, the monitor circuit 36 includes a motor model 46 modeling the motor 32, a first comparator 48, a second comparator 50, a first amplifier 52, a second amplifier 54, and an adder 56.

In contrast to the motor model 18 according to the first and second embodiments, the motor model 46 according to this embodiment models characteristics of the motor 32 as a two-input, three-output transfer system. In the motor model 46, the voltage V applied to the motor 32 and a torque τ acting on the motor 32 are set as inputs, while the current i flowing through the motor 32, a rotation speed ω of the motor 32, and the voltage V applied to the motor 32 are set as inputs.

A current output $i_e$ of the motor model 46 (i.e. an estimated value $i_e$ of the current flowing through the motor 32) is provided to the first comparator 48. In the first comparator 48, a difference Δi between an actually measured value $i_m$ of the current flowing through the motor 32 and the current output $i_e$ of the motor model 46 is calculated. The calculated difference Δi is amplified at a predetermined gain $G_i$ in the first amplifier 52, and then input into the adder 56. A voltage output $V_e$ of the motor model 46 (i.e. an estimated value $V_e$ of the voltage of the motor 32) is provided to the second comparator 50. In the second comparator 50, a difference ΔV between an actually measured value $V_m$ of the voltage of the motor 32 and the voltage output $V_e$ of the motor model 46 is calculated. The calculated difference ΔV is amplified at a predetermined gain $G_V$ in the second amplifier 54, and then input into the adder 56. A value obtained by adding together $G_i$Δi and $G_V$ΔV in the adder 56 is input into a torque input of the motor model 46 as the estimated torque $\tau_e$ of the motor 32. Thus, a feedback loop is constructed in the monitor circuit 36. The actually measured value $V_m$ of the voltage applied to the motor 32 is input into a voltage input of the motor model 46.

In the feedback loop described above, a magnitude of the input torque $\tau_e$ of the motor model 46, or in other words a magnitude of the estimated torque $\tau_e$, is adjusted by setting the gain $G_i$ used in the first amplifier 52 and the gain $G_V$ used in the second amplifier 54 to be sufficiently large so that the current output $i_e$ of the motor model 46 converges with the actually measured value $i_m$ of the current flowing through the motor 32 and the voltage output $V_m$ of the motor model 46 converges with the actually measured value $V_m$ of the voltage of the motor 32. With this constitution, the torque $\tau_e$ acting on the motor 32 at which the current $i_m$ flowing through the motor 32 is realized when a voltage $V_m$ is applied to the motor 32 can be estimated.

The monitor circuit 36 outputs the estimated torque $\tau_e$ as described above, and outputs a rotation speed output $\omega_e$ of the motor model 46 as an estimated rotation speed $\omega_e$ of the motor 32.

According to this embodiment, the rotation speed ω and the torque τ of the motor 32 can be estimated with a high degree of precision in a case where the motor 32 constituted by a DC motor is controlled by the motor driving circuit 34 by causing a current to flow thereto intermittently, or in other words subjected to PWM control, for example.

Fourth Embodiment

An electric tool 80 of this embodiment has substantially similar configuration as the electric tool 30 of the third embodiment shown in FIG. 1. Similar to the electric tool 30 of the third embodiment, in the electric tool 80 of the embodiment also, a motor 32 is a DC motor, and a motor driving circuit 34 shown in FIG. 7 performs PWM control of the motor 32. In the electric tool 80 of the embodiment, a monitor circuit 82 outputs torque and rotation speed of the motor 32.

Figure 9:
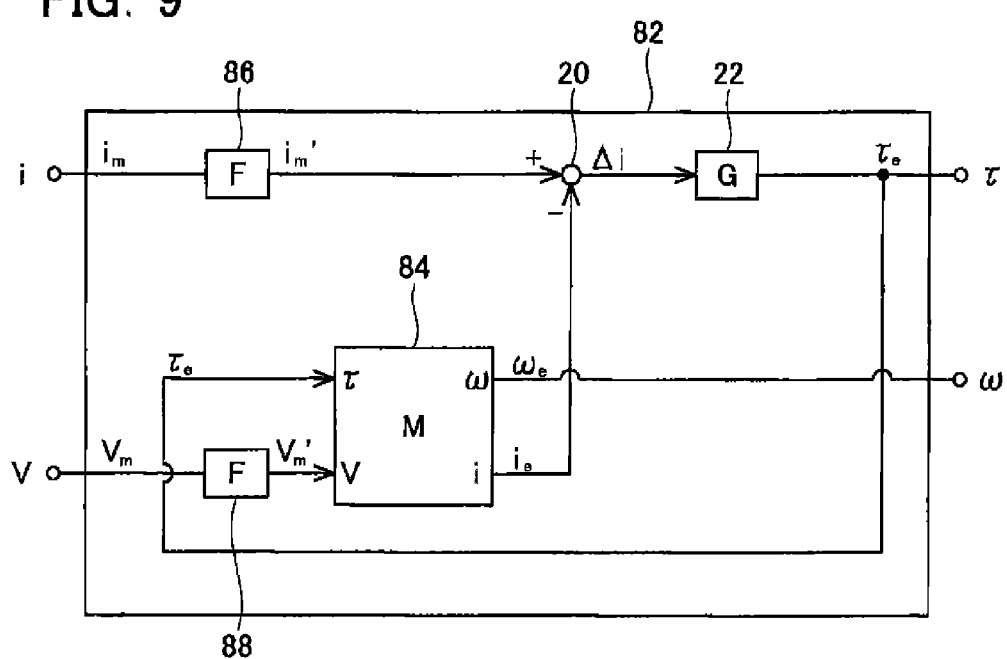
FIG. 9 is a block diagram showing a constitution of a monitor circuit 82.

As shown in FIG. 9, the monitor circuit 82 includes a motor model 84 that models the motor 32, a comparator 20, an amplifier 22, a first filter 86, and a second filter 88.

Similar to the motor model 18 of the first embodiment, the motor model 84 of the embodiment models characteristics of the motor 32 as a two-input, two-output transfer system. In the motor model 84, a voltage V applied to the motor 32 and torque τ acting on the motor 32 are set as inputs, while a current i flowing through the motor 32 and rotation speed ω of the motor 32 are set as outputs.

A current output of the motor model 84, or in other words an estimated value $i_e$ of the current flowing through the motor 32, is provided to the comparator 20. An actually measured value $i_m$ of the current flowing through the motor 32 is provided to the comparator 20 via the first filter 86. The first filter 86 is a filter that removes at least high frequency component, and for example may be a low-pass filter, or a band pass filter. In the comparator 20, a difference Δi between a value $i_m$' obtained by filtering the actually measured value $i_m$ of the current flowing through the motor 32 by the first filter 86 and the current output $i_e$ of the motor model 84 is calculated. The calculated difference Δi is amplified at a predetermined gain G in the amplifier 22. An output from the amplifier 22 is input into a torque input of the motor model 84 as an estimated torque $\tau_e$ of the motor 32. Thus, a feedback loop is constructed in the monitor circuit 82. An actually measured value $V_m$ of the voltage applied to the motor 32 is input into a voltage input of the motor model 84 via the second filter 88. In other words, a value $V_m$' obtained by filtering the actually measured value $V_m$ of the voltage applied to the motor 32 by the second filter 88 is input to the voltage input of the motor model 84. The second filter 88 is a filter having identical characteristics as the first filter 86.

On the feedback loop described above, a magnitude of the input torque $\tau_e$ of the motor model 84, or in other words a magnitude of the estimated value $\tau_e$ of the torque acting on the motor 32, is adjusted by setting the gain G used in the amplifier 22 to be sufficiently large so that the current output $i_e$ of the motor model 84 converges with the value $i_m$' obtained by filtering the actually measured value $i_m$ of the current flowing through the motor 32 by the first filter 86. With this constitution, the torque $\tau_e$ acting on the motor 32 at which the current $i_m$' flowing through the motor 32 is realized when the voltage $V_m$' is applied to the motor 32 can be estimated.

The monitor circuit 82 outputs the estimated torque $\tau_e$ as described above, and outputs a rotation speed output $\omega_e$ of the motor model 84 as an estimated rotation speed $\omega_e$ of the motor 32.

Figure 10:
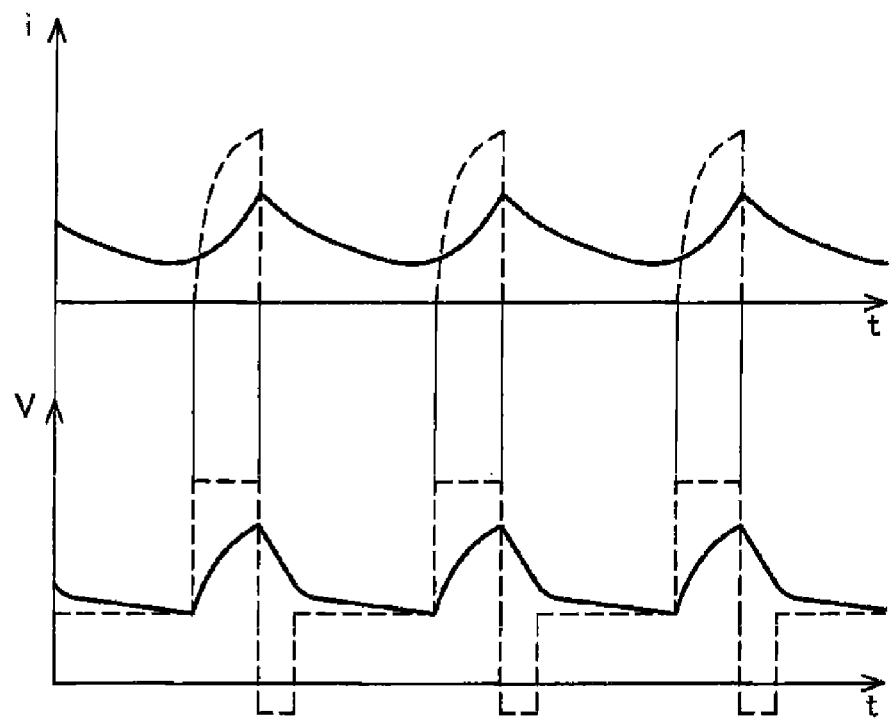
FIG. 10 is a diagram showing a chronological change in current i flowing through a motor 32 and a voltage V applied to the motor 32 in PWM control.

FIG. 10 shows a chronological change in the current i that flows in the motor 32, and the voltage V applied to the motor 32 in the case of performing the PWM control of the motor 32. In an upper side graph of FIG. 10, a dotted line indicates the actually measured value $i_m$ of the current, and a solid line indicates the value $i_m$' obtained by filtering the actually measured value $i_m$ of the current by the first filter 86. In a lower side graph of FIG. 10, a dotted line indicates the actually measured value $V_m$ of the voltage, and a solid line indicates the value $V_m$' obtained by filtering the actually measured value $V_m$ of the voltage by the second filter 88. As shown in FIG. 10, the actually measured value $i_m$ of the current and the actually measured value $V_m$ of the voltage rapidly fluctuate during an on time, they scarcely fluctuate in an off time. Due to this, in a case where an on-duty in the PWM control is small, the fluctuations of the actually measured value $i_m$ of the current and the actually measured value $V_m$ of the voltage during the on time cannot accurately be grasped unless a sampling cycle of the monitor circuit 82 is sufficiently short, whereby the estimation errors in the torque τ acting on the motor 32 and the rotation speed ω of the motor 32 become large. However, in order to shorten the sampling cycle of the monitor circuit 82, an IC chip having a correspondingly high performance needs to be used, whereby an increase in cost occurs. Thus, in the embodiment, filtering of the actually measured value $i_m$ of the current and the actually measured value $V_m$ of the voltage is performed using the first filter 86 and the second filter 88 having the identical characteristics as each other to remove the high frequency components. Due to this, as shown in FIG. 10, the fluctuations of the actually measured value $i_m$ of the current and the actually measured value $V_m$ of the voltage become moderate, and the operation of the motor 32 can accurately be grasped without having to shorten the sampling cycle of the monitor circuit 82 so short.

According to the embodiment, in the case of controlling the motor 32 that is the DC motor by the motor driving circuit 34 by intermittently flowing the current for example as in the PWM control, the rotation speed ω and the torque τ of the motor 32 can be estimated with satisfactory accuracy.

Fifth Embodiment

An electric tool 23 according to this embodiment is constituted substantially identically to the electric tool 2 according to the first embodiment, shown in FIG. 1. The electric tool 23 includes a monitor circuit 24 instead of the monitor circuit 14 according to the first embodiment. When the power transmission unit 6 includes an element such as a spring or an air cylinder, a waveform of a torque acting on the tool unit 4 differs greatly from a waveform of the torque acting on the motor 8. This tendency is particularly evident when an impact torque acts on the tool unit 4. The monitor circuit 24 according to this embodiment estimates the torque acting on the tool unit 4 instead of the torque acting on the motor 8.

Figure 11:
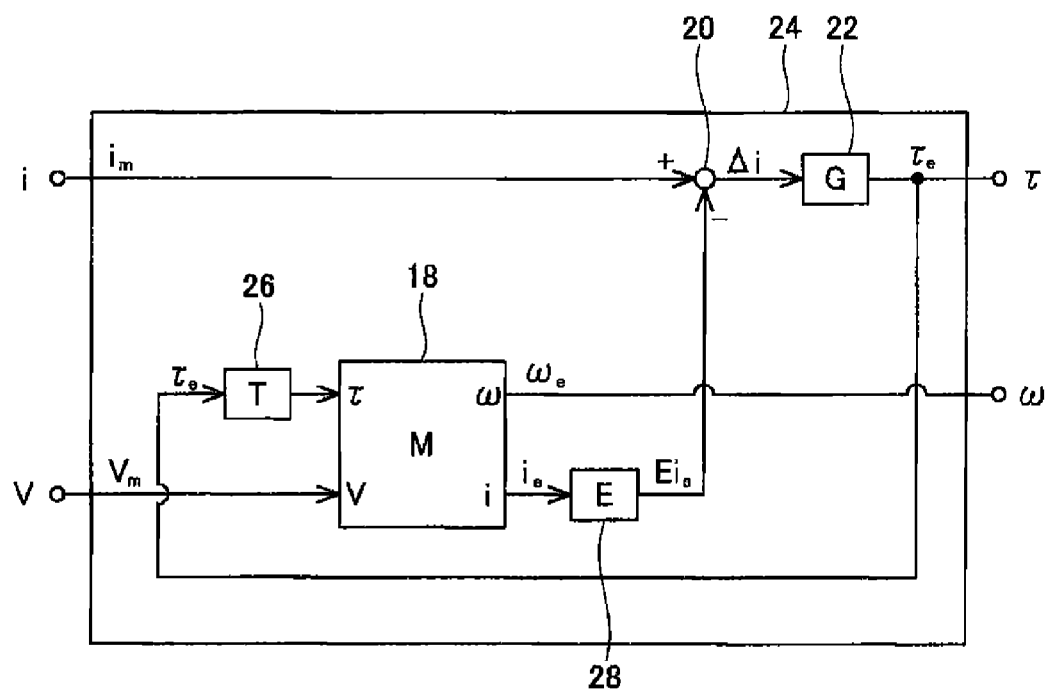
FIG. 11 is a block diagram showing a constitution of a monitor circuit 24.

As shown in FIG. 11, the monitor circuit 24 includes the motor model 18 modeling the motor 8, the comparator 20, the amplifier 22, a power transmission unit model 26 modeling the power transmission unit 6, and a current detection unit model 28 modeling the current detection unit 15.

The power transmission unit model 26 models characteristics of the power transmission unit 6 as a single-input, single-output transfer function. In the power transmission unit model 26, a torque acting on the power transmission unit 6 from the tool unit 4 is set as an input and a torque acting on the motor 8 from the power transmission unit 6 is set as an output. Characteristics of the power transmission unit model 26 can be specified on the basis of an input-output characteristic of the actual power transmission unit 6.

The current detection unit model 28 models characteristics of the current detection unit 15 as a single-input, single-output transfer function. In the current detection unit model 28, the current flowing through the motor 8 is set as an input and a current detected by the current detection unit 15 is set as an output. Characteristics of the current detection unit model 28 can be specified on the basis of an input-output characteristic of the actual current detection unit 15.

As shown in FIG. 11, the current output $i_e$ of the motor model 18 is provided to the comparator 20 via the current detection unit model 28. In the comparator 20, a difference $\Delta i$ between the actually measured value of the current flowing through motor 8, or in other words the current $i_m$ detected by the current detection unit 15, and a current output $Ei_e$ obtained from the current detection unit model 28 is calculated. The calculated difference $\Delta i$ is amplified at the predetermined gain G in the amplifier 22, and then input into the torque input of the motor model 18 via the power transmission unit model 26 as an estimated torque $\tau_e$ applied to the tool unit 4. Thus, a feedback loop is constructed in the monitor circuit 24. Note that the actually measured value $V_m$ of the voltage applied to the motor 8 is input into the voltage input of the motor model 18.

Figure 12:
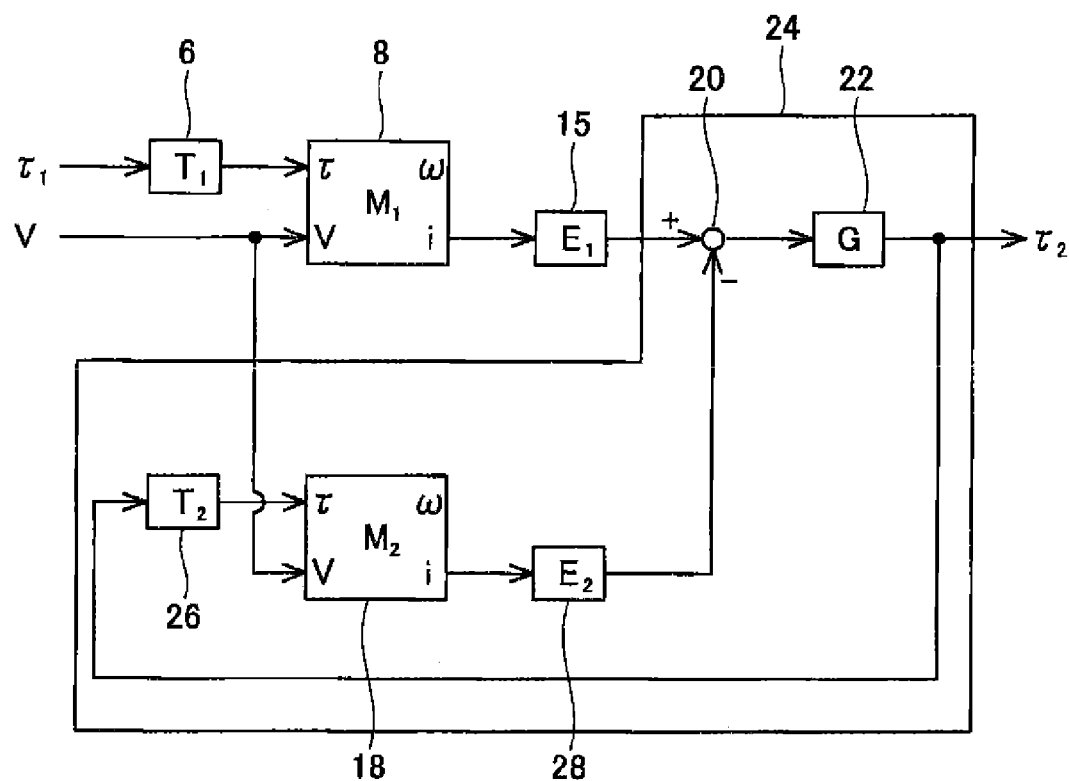
FIG. 12 is a block diagram showing a constitution obtained by combining the monitor circuit 24 with a power transmission unit 6, the motor 8, and a current detection unit 15.

FIG. 12 is a block diagram showing a constitution obtained by combining the monitor circuit 24 with the power transmission unit 6, the motor 8, and the current detection unit 15. In FIG. 12, the actual power transmission unit 6, motor 8, and current detection unit 15 are expressed by transfer functions $T_1$, $M_1$, and $E_1$, respectively. Further, the power transmission unit model 26, motor model 18, and current detection unit model 28 artificially modeling the power transmission unit 6, motor 8, and current detection unit 15 in the monitor circuit 24 are expressed by transfer functions $T_2$, $M_2$, and $E_2$, respectively. A relationship between an input $\tau_1$ (an actual torque value acting on the power transmission unit 6 from the tool unit 4) and an output $\tau_2$ (the torque estimated value output from the monitor circuit 24) of a control system shown in FIG. 12 is as follows.

$$\tau_2 = \frac{GE_1M_1T_1}{1+GE_2M_2T_2}\tau_1 \quad \text{(Equation 7)}$$

Hence, by setting the power transmission unit model 26, motor model 18, and current detection unit model 28 in the monitor circuit 24 to have equal characteristics to the actual power transmission unit 6, motor 8, and current detection unit 15, $E_1=E_2=E$, $M_1=M_2=M$, and $T_1=T_2=T$ can be inserted into the above equation, whereby a following relational expression is obtained.

$$\tau_2 = \frac{GEMT}{1+GEMT}\tau_1 \quad \text{(Equation 8)}$$

The above response function is equivalent to that of a feedback control system in which the forward transfer function is GEMT and the backward transfer function is 1. Accordingly, the output $\tau_2$ varies in conjunction with the input $\tau_1$. By setting the gain G of the amplifier 22 to be sufficiently large, the output $\tau_2$ converges with the input $\tau_1$. Therefore, the torque $\tau_1$ acting on the power transmission unit 6 from the tool unit 4, or in other words the torque acting on the tool unit 4, can be learned from the torque estimated value $\tau_2$ output from the monitor circuit 24.

Notably, in the embodiment, the constitution that is modified to estimate the torque acting on the tool unit 4 in the electric tool 2 of the first embodiment shown in FIG. 1 instead of estimating the torque acting on the motor 8 is described, however, based on a similar concept, in the electric tool 60 of the second embodiment shown in FIG. 5, the constitution thereof may be modified to estimate torque acting on the tool unit 4 instead of estimating the torque acting on the motor 8. Alternatively, in the electric tool 30 of the third embodiment shown in FIG. 1, and the electric tool 80 of the fourth embodiment, the constitution thereof may be modified to estimate torque acting on the tool unit 4 instead of estimating the torque acting on the motor 32.

Various motors may be used as the motor 8 in the first to fifth embodiments described above. For example, the motor 8 may be a DC brushless motor, a series wound commutator motor, an induction motor, and so on rather than a DC motor.

Representative, non-limiting examples of the present invention is described herein in detail with reference to the attached drawings. This detailed description is merely intended to teach a person of skill in the art further details for practicing preferred aspects of the present teachings and is not intended to limit the scope of the invention. Furthermore, each of the additional features and teachings disclosed herein may be utilized separately or in conjunction with other features and teachings to provide improved apparatuses and power tools.

Moreover, combinations of features and steps disclosed herein may not be necessary to practice the invention in the broadest sense, and are instead taught merely to particularly describe representative examples of the invention. Furthermore, various features of the above-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

Specific examples of the present invention were described in detail above, but these examples do not limit the scope of the claims. Techniques described in the claims include various amendments and modifications implemented on the specific examples described above. Technical elements described in the specification or illustrated in the drawings exhibit technical utility singly or in various combinations, and are not limited to combinations described in the claims at the time of filing. Further, techniques described in the specification or illustrated in the drawings may realize a plurality of objects simultaneously, and exhibit technical utility simply by realizing one of these objects.

The invention claimed is:

1. An apparatus for estimating a quantity of state relating to a motor, comprising:
    a motor model that includes at least inputs comprising a voltage applied to the motor and a torque acting on the motor, and an output comprising a current flowing through the motor;
    a comparator that calculates a difference between the current in an actual motor and the current output from the motor model; and
    an amplifier that amplifies an output of the comparator at a predetermined gain,
    wherein:
        the voltage in the actual motor is input into the motor model,
        the motor model calculates the current output based on the voltage and torque inputs by performing a numerical calculation not including a differentiation operation, and
        an output of the amplifier is set as an estimated value of the torque in the actual motor and is input into the motor model.

2. The apparatus according to claim 1, wherein
the motor is controlled by causing a current to flow thereto intermittently,
the motor model further includes an output comprising the voltage applied to the motor,
the apparatus further comprises:
    a second comparator that calculates a difference between the voltage applied to the motor in the actual motor and the voltage applied to the motor output from the motor model; and
    a second amplifier that amplifies an output of the second comparator at a predetermined gain,
the output of the amplifier is added to an output of the second amplifier, and
a value obtained by adding the output of the second amplifier to the output of the amplifier is set as the estimated value of the torque acting on the actual motor and is input into the motor model.

3. The apparatus according to claim 2, wherein
the motor is installed in an electric tool provided with a tool unit and a power transmission unit for transmitting a rotation of the motor to the tool unit,
the apparatus further comprises a power transmission unit model that includes an input comprising a torque acting on the power transmission unit from the tool unit, and an output comprising the torque acting on the motor from the power transmission unit,
the output of the amplifier is set as an estimated value of a torque acting on an actual tool unit rather than the estimated value of the torque acting on the actual motor and is input into the motor model via the power transmission unit model.

4. The apparatus according to claim 1, further comprising:
a first filter that removes at least high frequency components; and
a second filter having identical characteristics as the first filter,
wherein
    the motor is controlled by flowing a current intermittently,
    the current flowing through the motor in the actual motor is input to the comparator via the first filter, and
    the voltage applied to the motor in the actual motor is input to the motor model via the second filter.

5. The apparatus according to claim 4, wherein
the motor is installed in an electric tool provided with a tool unit and a power transmission unit for transmitting a rotation of the motor to the tool unit,
the apparatus further comprises a power transmission unit model that includes an input comprising a torque acting on the power transmission unit from the tool unit, and an output comprising the torque acting on the motor from the power transmission unit,
the output of the amplifier is set as an estimated value of a torque acting on an actual tool unit rather than the estimated value of the torque acting on the actual motor and is input into the motor model via the power transmission unit model.

6. The apparatus according to claim 1, wherein
the motor is installed in an electric tool provided with a tool unit and a power transmission unit for transmitting a rotation of the motor to the tool unit,
the apparatus further comprises a power transmission unit model that includes an input comprising a torque acting on the power transmission unit from the tool unit, and an output comprising the torque acting on the motor from the power transmission unit,
the output of the amplifier is set as an estimated value of a torque acting on an actual tool unit rather than the estimated value of the torque acting on the actual motor and is input into the motor model via the power transmission unit model.

7. An electric tool comprising the apparatus according to claim 1.

8. The apparatus according to claim 1, wherein the numerical calculation includes a numerical integration.

9. The apparatus according to claim 8, wherein the numerical integration relates to simultaneous integral equations as follows:

$$i = \int \left(\frac{1}{L}V - \frac{R}{L}i - \frac{KB}{L}\omega\right)dt$$

$$\omega = \int \left(\frac{KT}{J}i - \frac{B}{J}\omega - \frac{1}{J}\tau\right)dt$$

where i is the current output, ω is a rotation speed of the motor, V is the voltage input, τ is the torque input, L is an inductance of the motor, R is a resistance value of the motor, KB is a power generation constant of the motor, J is a moment of inertia of a rotor of the motor, KT is a torque constant of the motor, and B is a friction constant of the motor.

10. An apparatus for estimating a quantity of state relating to a motor, comprising:
 a motor model that includes at least inputs comprising a voltage applied to the motor and a torque acting on the motor, and outputs comprising a current flowing through the motor and a rotation speed of the motor;
 a comparator that calculates a difference between the current in an actual motor and the current output from the motor model; and
 an amplifier that amplifies an output of the comparator at a predetermined gain,
 wherein:
  the voltage in the actual motor is input into the motor model,
  the motor model calculates the current and rotation speed outputs based on the voltage and torque inputs by performing a numerical calculation not including a differentiation operation,
  an output of the amplifier is set as an estimated value of the torque in the actual motor and is input into the motor model, and
  the rotation speed output from the motor model is set as an estimated value of the rotation speed in the actual motor.

11. The apparatus according to claim 10, wherein
the motor is controlled by causing a current to flow thereto intermittently,
the motor model further includes an output comprising the voltage applied to the motor,
the apparatus further comprises:
 a second comparator that calculates a difference between the voltage applied to the motor in the actual motor and the voltage applied to the motor output from the motor model; and
 a second amplifier that amplifies an output of the second comparator at a predetermined gain,
the output of the amplifier is added to an output of the second amplifier, and
a value obtained by adding the output of the second amplifier to the output of the amplifier is set as the estimated value of the torque acting on the actual motor and is input into the motor model.

12. The apparatus according to claim 11, wherein
the motor is installed in an electric tool provided with a tool unit and a power transmission unit for transmitting a rotation of the motor to the tool unit,
the apparatus further comprises a power transmission unit model that includes an input comprising a torque acting on the power transmission unit from the tool unit, and an output comprising the torque acting on the motor from the power transmission unit,
the output of the amplifier is set as an estimated value of a torque acting on an actual tool unit rather than the estimated value of the torque acting on the actual motor and is input into the motor model via the power transmission unit model.

13. The apparatus according to claim 10, further comprising:
 a first filter that removes at least high frequency components; and
 a second filter having identical characteristics as the first filter,
 wherein
  the motor is controlled by flowing a current intermittently,
  the current flowing through the motor in the actual motor is input to the comparator via the first filter, and
  the voltage applied to the motor in the actual motor is input to the motor model via the second filter.

14. The apparatus according to claim 13, wherein
the motor is installed in an electric tool provided with a tool unit and a power transmission unit for transmitting a rotation of the motor to the tool unit,
the apparatus further comprises a power transmission unit model that includes an input comprising a torque acting on the power transmission unit from the tool unit, and an output comprising the torque acting on the motor from the power transmission unit,
the output of the amplifier is set as an estimated value of a torque acting on an actual tool unit rather than the estimated value of the torque acting on the actual motor and is input into the motor model via the power transmission unit model.

15. The apparatus according to claim 10, wherein
the motor is installed in an electric tool provided with a tool unit and a power transmission unit for transmitting a rotation of the motor to the tool unit,
the apparatus further comprises a power transmission unit model that includes an input comprising a torque acting on the power transmission unit from the tool unit, and an output comprising the torque acting on the motor from the power transmission unit,
the output of the amplifier is set as an estimated value of a torque acting on an actual tool unit rather than the estimated value of the torque acting on the actual motor and is input into the motor model via the power transmission unit model.

16. An electric tool comprising the apparatus according to claim 10.

17. The apparatus according to claim 10, wherein the numerical calculation includes a numerical integration.

18. The apparatus according to claim 17, wherein the numerical integration relates to simultaneous integral equations as follows:

$$i = \int \left(\frac{1}{L}V - \frac{R}{L}i - \frac{KB}{L}\omega\right)dt$$

$$\omega = \int \left(\frac{KT}{J}i - \frac{B}{J}\omega - \frac{1}{J}\tau\right)dt$$

where i is the current output, w is a rotation speed of the motor, V is the voltage input, τ is the torque input, L is an inductance of the motor, R is a resistance value of the motor, KB is a power generation constant of the motor, J is a moment of inertia of a rotor of the motor, KT is a torque constant of the motor, and B is a friction constant of the motor.

19. An apparatus for estimating a quantity of state relating to a motor, comprising:
a motor model that includes at least inputs comprising a voltage applied to the motor and a torque acting on the motor, and outputs comprising a rotation speed of the motor and a current flowing through the motor;
a comparator that calculates a difference between the rotation speed in an actual motor and the rotation speed output from the motor model; and
an amplifier that amplifies an output of the comparator at a predetermined gain,
wherein:
the voltage in the actual motor is input into the motor model,
the motor model calculates the current and rotation speed outputs based on the voltage and torque inputs by performing a numerical calculation not including a differentiation operation,
an output of the amplifier is set as an estimated value of the torque in the actual motor and is input into the motor model, and
the current output from the motor model is set as an estimated value of the current in the actual motor.

20. The apparatus according to claim 19, wherein
the motor is installed in an electric tool provided with a tool unit and a power transmission unit for transmitting a rotation of the motor to the tool unit,
the apparatus further comprises a power transmission unit model that includes an input comprising a torque acting on the power transmission unit from the tool unit, and an output comprising the torque acting on the motor from the power transmission unit,
the output of the amplifier is set as an estimated value of a torque acting on an actual tool unit rather than the estimated value of the torque acting on the actual motor and is input into the motor model via the power transmission unit model.

21. An electric tool comprising the apparatus according to claim 19.

22. The apparatus according to claim 19, wherein the numerical calculation includes a numerical integration.

23. The apparatus according to claim 22, wherein the numerical integration relates to simultaneous integral equations as follows:

$$i = \int \left( \frac{1}{L} V - \frac{R}{L} i - \frac{KB}{L} \omega \right) dt$$

$$\omega = \int \left( \frac{KT}{J} i - \frac{B}{J} \omega - \frac{1}{J} \tau \right) dt$$

where i is the current output, ω is a rotation speed of the motor, V is the voltage input, τ is the torque input, L is an inductance of the motor, R is a resistance value of the motor, KB is a power generation constant of the motor, J is a moment of inertia of a rotor of the motor, KT is a torque constant of the motor, and B is a friction constant of the motor.

* * * * *